US006311392B1

(12) United States Patent
Lin

(10) Patent No.: US 6,311,392 B1
(45) Date of Patent: Nov. 6, 2001

(54) TELECOMMUNICATION CORDAGE FIXTURE AND INSERTION TOOL

(75) Inventor: Chen-Chieh Lin, Indianapolis, IN (US)

(73) Assignee: Avay Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/409,750

(22) Filed: Oct. 1, 1999

(51) Int. Cl.[7] ..................................................... B23P 19/00

(52) U.S. Cl. ................................ 29/748; 29/747; 29/854

(58) Field of Search ............................ 29/747, 750, 854, 29/748

(56) References Cited

U.S. PATENT DOCUMENTS 2,907,241 * 10/1959 Lazar ..................................... 29/747
2,960,864 * 11/1960 Watts ..................................... 29/747
3,010,193 * 11/1961 Croall, Jr. et al. .
3,074,155 * 1/1963 Cootes et al. .......................... 29/747
3,538,585 * 11/1970 Hendry et al. ......................... 29/747
3,605,234 * 9/1971 Bogursky ............................... 29/747
3,811,168 * 5/1974 Anderson et al. ...................... 29/747
5,655,294 * 8/1997 Makino ................................. 29/750

* cited by examiner

*Primary Examiner*—Carl J. Arbes
(74) *Attorney, Agent, or Firm*—Thomas, Kayden, Horstemeyer & Risley, LLP

(57) ABSTRACT

In general, a cordage fixture and insertion tool provides a system and method of stabilizing wires of a cordage so that echo properties of telecommunication cords, created by use of the tool, are similar and may be effectively cancelled by a modular device to which the cord is attached. The tool comprises an elongated body having a longitudinal concave portion therein, which extends through the length of the tool. The width of the longitudinal concave portion is shaped in accordance with the size of the cord for which the tool is created. An elongated member extends from one end of the elongated body in a manner axially adjacent to the central axis of the longitudinal concave portion, and is capable of receiving a crimp ring, located on the cord so as to stabilize the cord during insertion of a plug subassembly into a housing.

13 Claims, 5 Drawing Sheets

TELECOMMUNICATION CORDAGE FIXTURE AND INSERTION TOOL

FIELD OF THE INVENTION

The present invention generally relates to telecommunications. More specifically, the invention is related to a telecommunication cordage fixture and insertion tool for holding cordage during wire management and assisting in the insertion of a plug subassembly into an outer housing of a communication modular plug, while ensuring minimal wire shift.

BACKGROUND OF THE INVENTION

Modular telecommunication cords are used in the field of telecommunications for connecting between modular telecommunication devices. These cords hold cordage, which is comprised of a series of wires, within an outer jacket which, in turn, protects the cordage. Generally, a communication modular plug is located on the ends of the modular telecommunication cord, for connecting to modular telecommunication devices.

In accordance with the latest modular telecommunication cord design, one end of a sled is inserted into the outer jacket of the telecommunication cord, thereby providing a means of externally arranging the series of wires in the cordage. Wire arrangement is usually performed according to the polarity of the wires, although wire arrangement may be performed for other reasons. A metal crimp ring is also used to provide strain relief on the outside of the outer jacket.

Unfortunately, the cordage is difficult to hold while manipulating the wires for purposes such as arranging and inserting the wires into the sled, and inserting into a housing. To accommodate this difficulty, production operators generally have a tendency of wrapping the cordage around their fingers, thereby providing a better grip of the cordage during manipulation. This generally used technique causes the length of the wires to be uneven within the outer jacket of the cordage. Finally, when the wires are situated in the sled, they are trimmed.

Production of the finished modular telecommunication cord requires insertion of the wired sled into a housing, which, in combination with the sled, provides a means of connecting the modular telecommunication cord to modular telecommunication devices. Unfortunately, insertion of the wired sled into the housing, by holding the cordage, provides a further strain on the wires of the cordage, and additional shifting of the wires.

During the transmission and reception process of a telecommunication device, a receive signal, received from a first transmission line, can be corrupted by a transmit signal located on a second transmission line. This corruption is oftentimes referred to as an "echo" in that the corruption is substantially similar to the transmit signal, although attenuated in amplitude and delayed in phase in comparison. As such, each modular telecommunication cord has its own echo. One source of this echo in the cord is attributed to the length of wires in the outer jacket of the cordage. This "echo" is generally cancelled by the modular device to which the cord is attached. If however, numerous cords are attached to the modular device, via modular plugs, it is difficult, if not impossible, for the modular device to provide "echo cancellation" for all cords attached. Different lengths of wires within the outer jacket of the cordage provide different "echoes," thereby making it difficult for the modular device to provide accurate echo cancellation for all modular telecommunication cords attached thereto, without excessive cost for additional echo cancellation devices.

Therefore, it is desirable to provide a system and method for creating modular telecommunication cords having similar echo properties.

SUMMARY OF THE INVENTION

Briefly described, the invention provides a cordage fixture and insertion tool for assisting in the creation of modular telecommunication cords, while assuring that the modular telecommunication cords have similar echo properties.

Generally, the tool supplies a means of securing a modular telecommunication cord, having a sled attached thereto and wired to wires within the cord, before insertion of the wired sled into a housing. Securing of the cord prevents the creation of different lengths of wires within the cord after clipping of the wires. This assures that cords created with use of the tool will have similar wire length, thereby assuring that proper echo cancellation may be provided by a modular device, to which the cord is attached.

The tool comprises an elongated body having a longitudinal concave portion therein, which extends through the length of the tool. The width of the longitudinal concave portion is shaped in accordance with the size of the cord for which the tool is created. An elongated member extends from one end of the elongated body in a manner axially adjacent to the central axis of the longitudinal concave portion, and is capable of receiving a crimp ring, located on the cord.

An alternative embodiment provides for the elongated member to be removably attachable to the elongated body.

The invention has numerous advantages, a few of which are delineated hereafter as examples. Note that the embodiments of the invention which are described herein possess one or more, but not necessarily all, of the advantages set out hereafter.

One advantage of the invention is that, it provides a means of assuring that the echo properties of multiple modular telecommunication cords are similar so that the modular device, to which the cords are attached, may provide effective echo cancellation.

Other features and advantages of the invention will become apparent to one of reasonable skill in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which however, should not be taken to limit the invention to the specific embodiment, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE DRAWINGS

Figure 1:
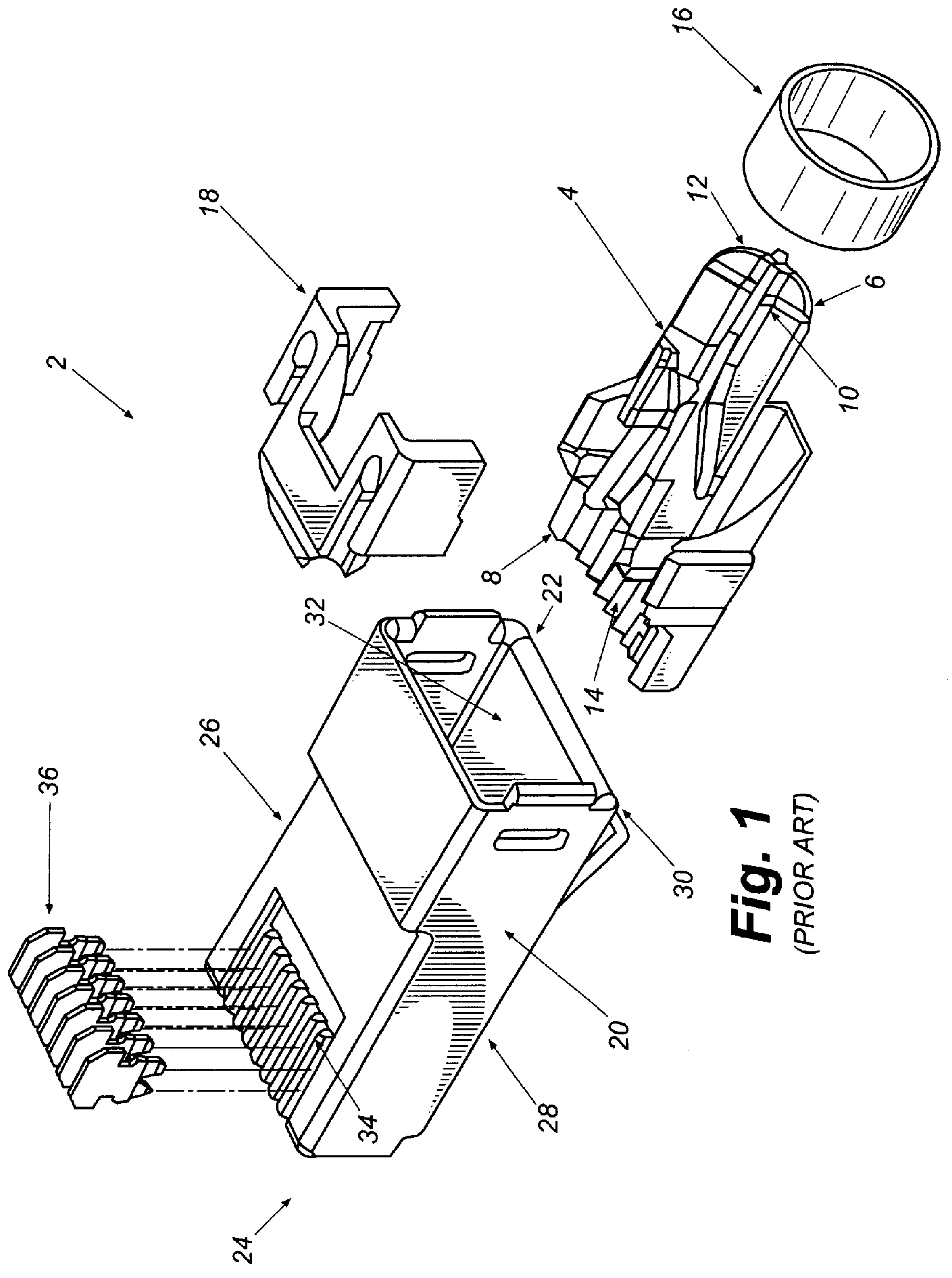
Fig. 1 (PRIOR ART)

FIG. 1 illustrates a plug assembly used by the telecommunication cord of the present invention.

Figure 2:
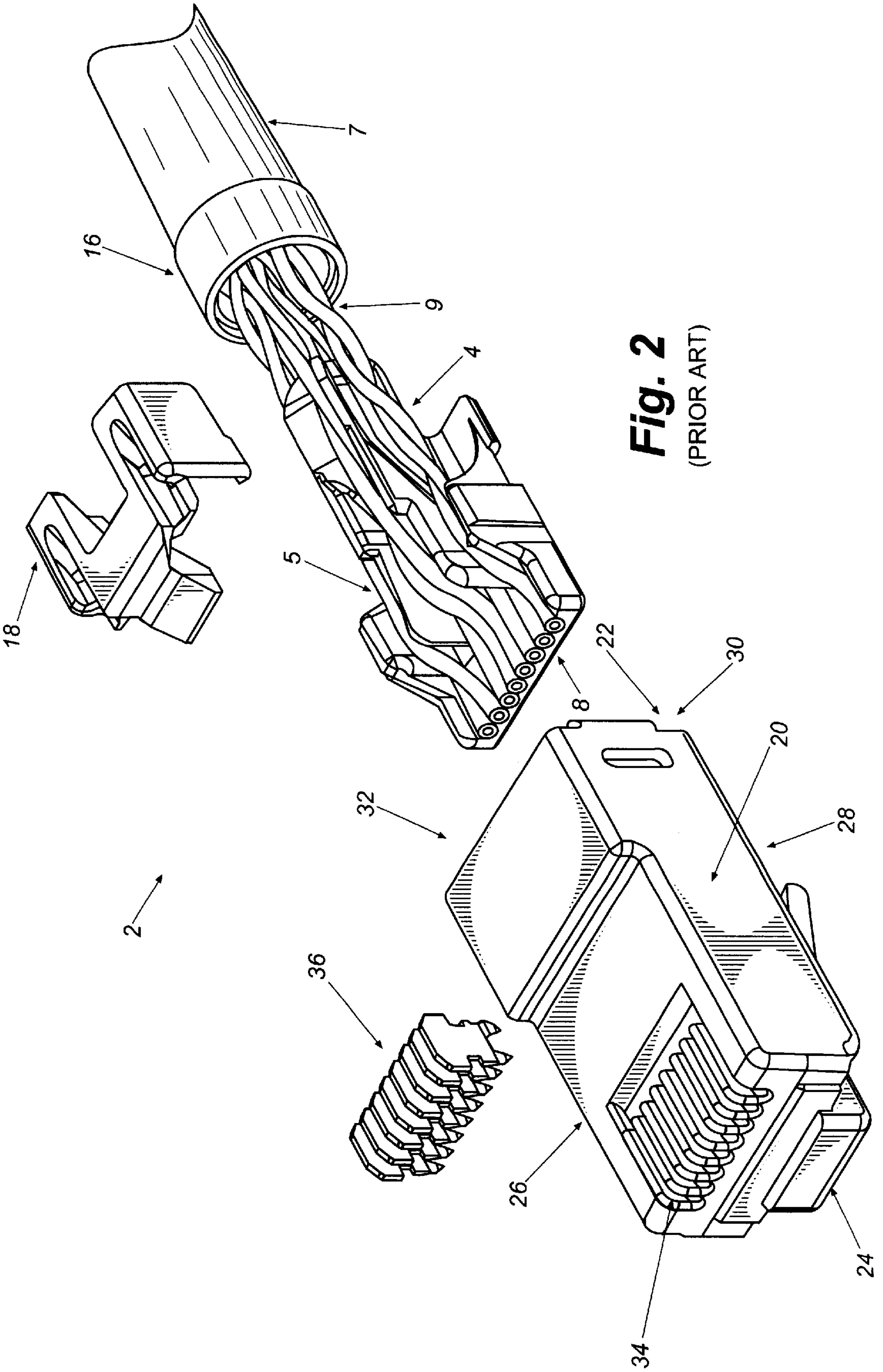
Fig. 2 (PRIOR ART)

FIG. 2 further illustrates the plug assembly of FIG. 1 having wires therein.

Figure 3:
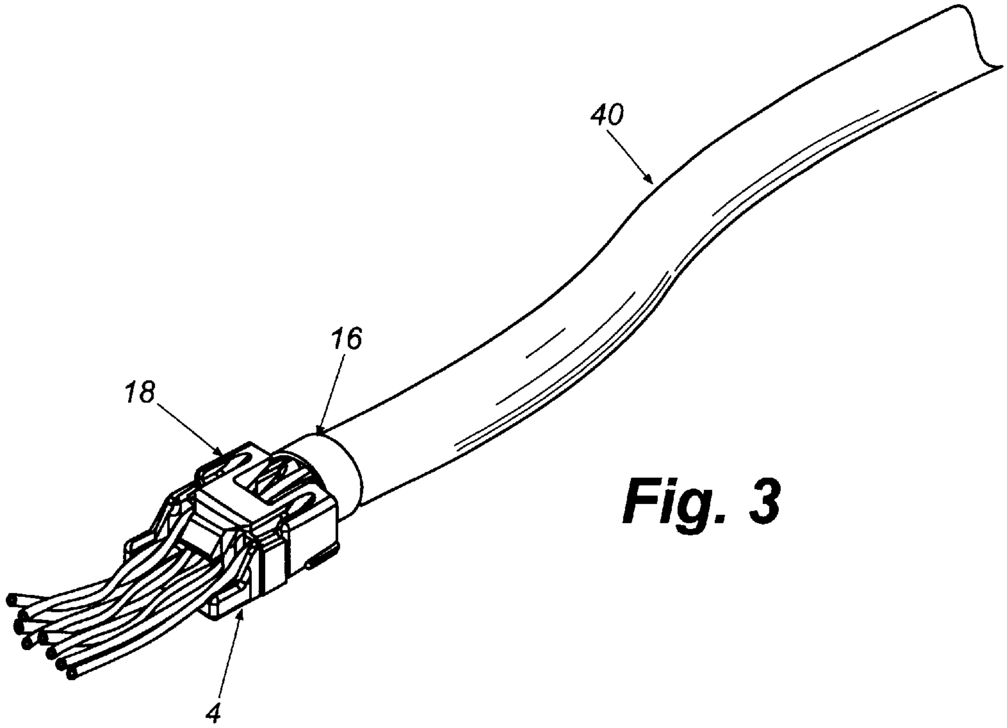

FIG. 3 illustrates a modular telecommunication cord having a sled, cover, and crimp ring attached.

Figure 4:
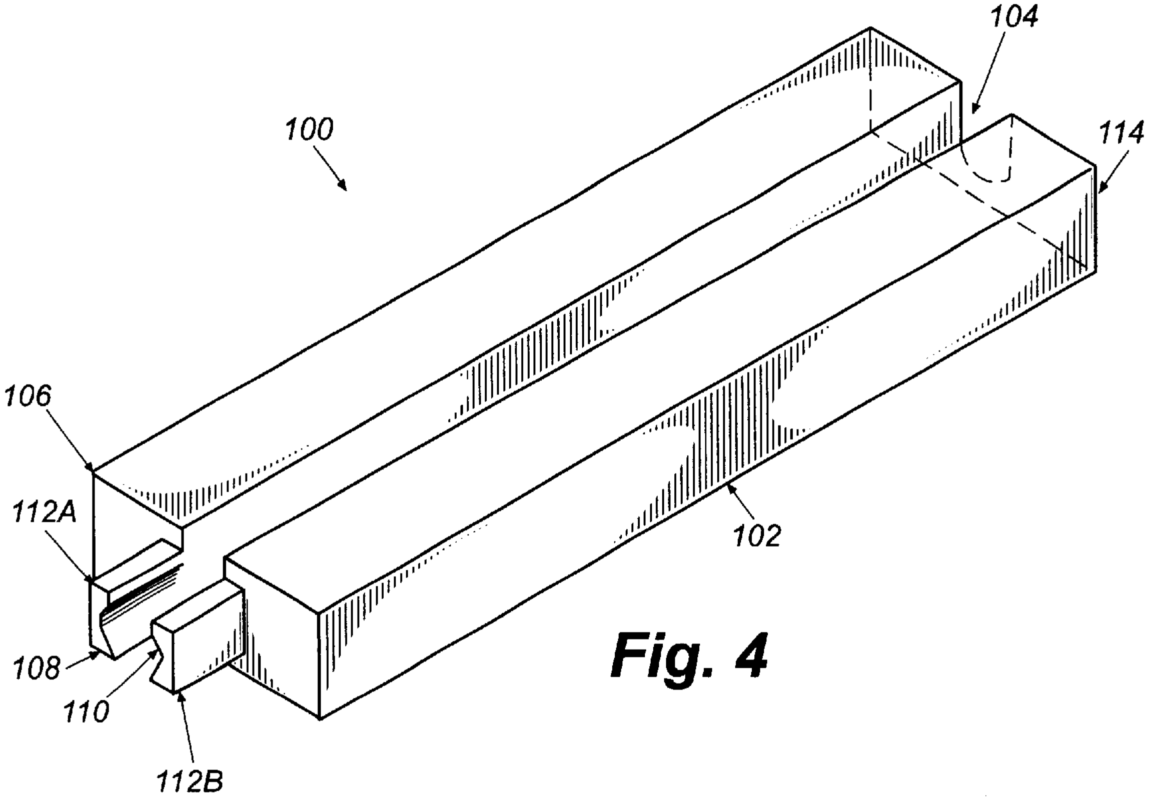

FIG. 4 illustrated the cordage fixture and insertion tool in accordance with the preferred embodiment of the invention.

Figure 5:
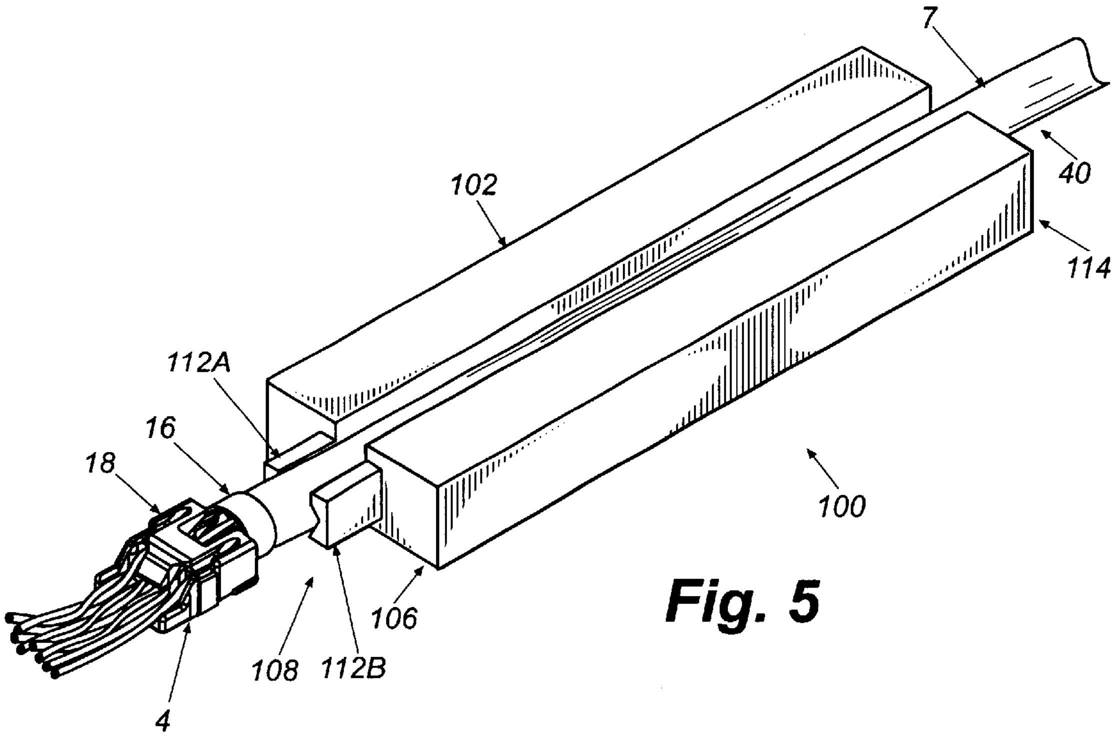

FIG. 5 illustrates the cordage fixture and insertion tool of FIG. 4, during the first step of constructing the modular telecommunication cord of FIG. 3.

Figure 6:
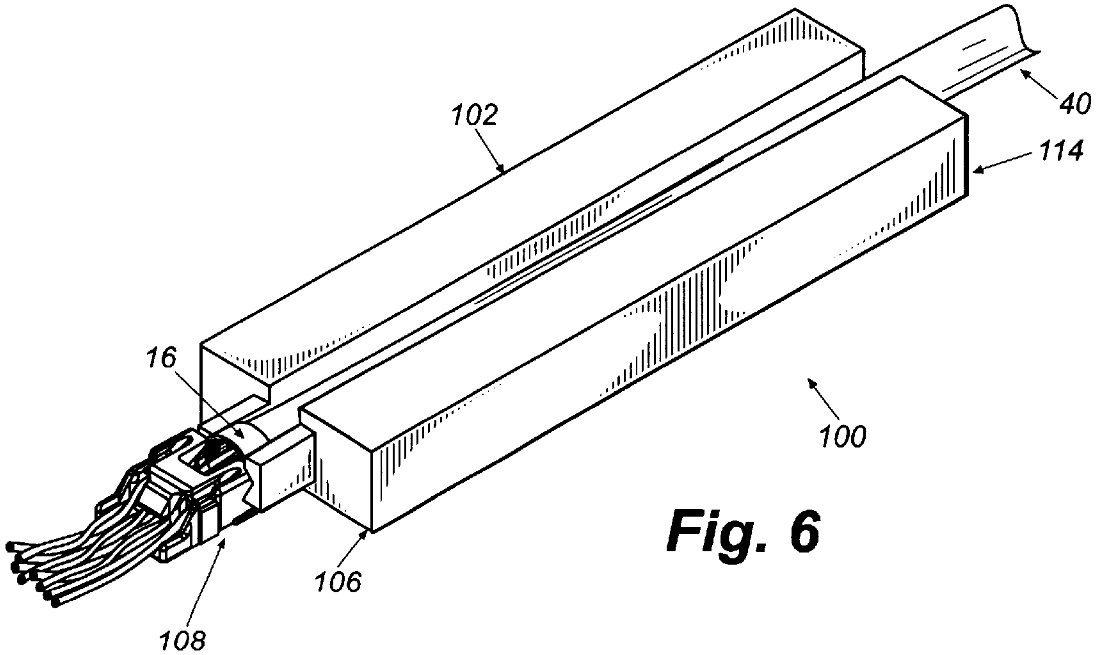

FIG. 6 further illustrates the process of making the modular telecommunication cord of FIG. 3, wherein the crimp ring is held by said tool.

Figure 7:
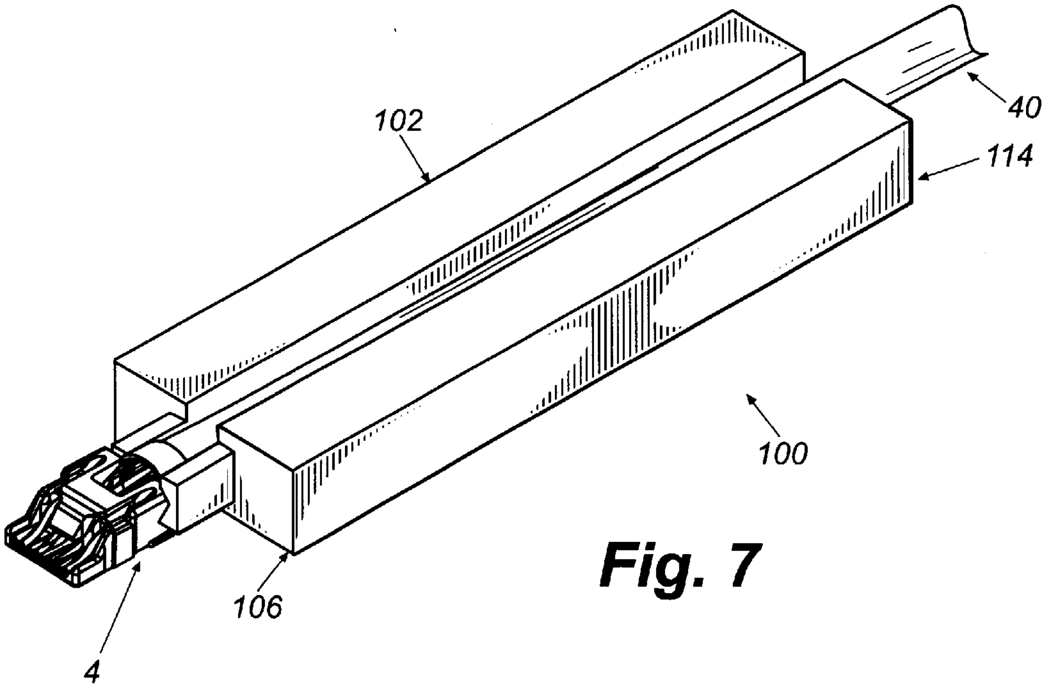

FIG. 7 illustrates the modular telecommunication cord of FIG. 6, after the wires have been clipped.

Figure 8:
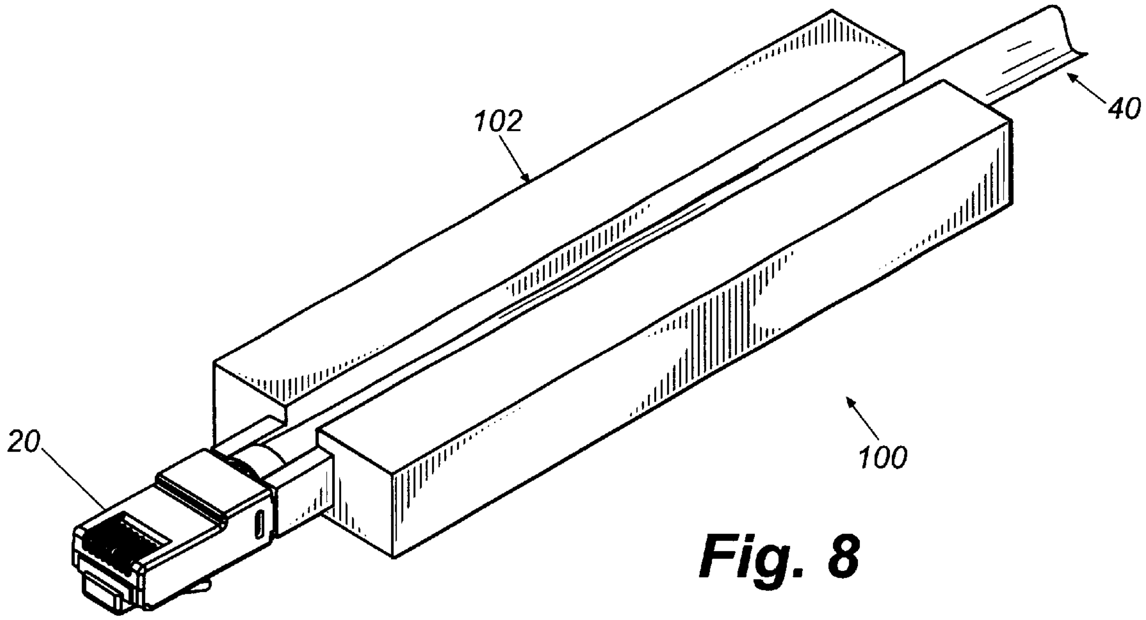

FIG. 8 illustrates the modular telecommunication cord of FIG. 7, after the cord, with the sled, cover, and crimp ring attached, has been connected to a housing.

DESCRIPTION OF THE PREFERRED EMBODIMENT

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives, following within the spirit and scope of the invention as defined by the claims.

The present invention will be described hereafter by way of example with respect to a modular telecommunication cord. The skilled artisan will nevertheless appreciate that the teachings disclosed herein can be applied to other types of cables wherein during assembly of such cables, there is a need to keep the wires therein in a stationary position.

Turning now to the drawings, wherein like reference numerals designate corresponding parts throughout the drawings, FIG. 1 illustrates a plug assembly 2 which may be used in conjunction with the cordage fixture and insertion tool in the making of a modular telecommunication cord. A possible implementation of the plug assembly 2 is described in the copending, commonly assigned application entitled, "Communication Cable Terminating Plug, filed Dec. 16, 1998, and having Ser. No. 09/212,889, the disclosure of which is incorporated herein by reference.

In accordance with FIG. 1, a sled 4 having a proximate 6 and a distal portion 8 is illustrated. The proximate portion 6 of the sled 4 contains a divider 10, central to the proximate portion 6, which extends into the sled 4 for purposes of dividing wires 5, from a cordage 9, into groups during insertion into the sled 4, as shown by FIG. 2. Dividing of the wires 5 may be performed for such reasons as differentiating between wire polarity. Preferably, a proximate end 12 of the proximate portion 6 of the sled 4 is shaped in a cylindrical fashion so as to fit into a cord outer jacket 7 (FIG. 2). While the proximate end 12 is preferably shaped cylindrically, one of reasonable skill in the art will appreciate that any shape which provides an opening in which the wires 5 (FIG. 2) may be inserted, and which allows the proximate portion 6 of the sled 4 to be inserted into the outer jacket 7 (FIG. 2) of the cord, may be used.

The proximate portion 6 of the sled 4 is inserted into the outer jacket 7 (FIG. 2) of the cord, thereby exposing the wires 5 (FIG. 2) over the distal portion 8 of the sled 4. The distal portion 8 of the sled 4 provides grooves 14 for supporting the wires in a uniform fashion. Preferably, the number of grooves 14 located within the distal portion 8 is equivalent to the number of wires 5 in the cordage 9, although this is not required. A crimp ring 16 is used to provide strain relief on the outside of the outer jacket 7. The crimp ring 16 may be made of any solid or semi solid material, which will provide appropriate strain relief on the outside of the outer jacket 7. A cover 18 is provided for protecting the proximate portion 6 of the sled 4 and aligning the wires 5, which have been sorted by the divider 10. FIG. 3 illustrates the modular telecommunication cord 40 after the sled 4, cover 18, and crimp ring 16 have been attached.

Referring back to FIG. 1, a housing 20 is provided having a proximate 22 and distal portion 24, and a top 26 and a bottom portion 28. A proximate end 30 of the proximate portion 22 contains an opening 32 into which the sled 4 may be inserted, with the attached cover 18. The top distal portion of the housing 20 contains a series of slits 34 wherein blades 36 may be inserted into the slits 34 when the sled 4 and cover 18 have been inserted into the housing 20 and are situated below the slits 34. When the blades 36 are inserted, they cut through wire insulation, thereby exposing the wires 5 to the blades 36 and, in turn, exposing the conductance of the wires 5 through the top distal portion of the housing 20.

FIG. 4 illustrates the cordage fixture and insertion tool 100 in accordance with the preferred embodiment of the invention. An explanation of use of the cordage fixture and insertion tool 100 shall be provided in accordance with FIGS. 5–8. With reference to FIG. 4, an elongated body 102 is provided having a longitudinal concave portion 104, which extends through the length of the tool 100. The elongated body 102 is preferably in a rectangular shape, so as to provide ease of handling. However, the elongated body 102 need not be limited to a rectangular shape, but instead may have any shape which provides ease of handling, while maintaining the width of the longitudinal concave portion 104 as described below. The width of the longitudinal concave portion 104 is set in accordance with the width of the modular telecommunication cord 40 for which the cordage fixture and insertion tool 100 will be used, such that the longitudinal concave portion 104 of the cordage fixture and insertion tool 100 is capable of receiving the modular telecommunication cord 40. As such, the width of the longitudinal concave portion 104 may be different in accordance with the type of cord used. As an example, a modular telecommunication cord 40 which uses a four twisted pair wire would be significantly larger than a telecommunication cord 40 which uses a two twisted pair wire.

A proximate portion 106 of the elongated body 102 contains an elongated member 108, which extends from the proximate portion 106 of the body 102 in a manner axially adjacent to the central axis of the longitudinal concave portion 104. The elongated member 108 is capable of receiving the crimp ring 16 of the plug assembly 2, such that when the modular telecommunication cord 40 is inserted into the cordage fixture and insertion tool 100, the ring 16 is flush with a central portion 110 of the elongated member 108. In accordance with the preferred embodiment of the invention, the crimp ring 16, when pressed onto the outer jacket 7 of the modular telecommunication cord 40, is shaped in a manner similar to the central portion 110 of the elongated member 108.

Preferably, the elongated member 108 is comprised of two separate fingers 112A–112B which each extend outward from the proximate portion 106 of the body 102. The fingers 112A–112B extend parallel to each other wherein the central portion of the first finger 112A is facing the central portion of the second finger 112B. The central portions of the fingers 112A–112B are shaped in a concave manner so as to be capable of holding the crimp ring 16 during wire manipulation. Preferably, the central portion of the first finger 112A is shaped in the form of a V, as is the central portion of the second finger 112B, thereby providing two grooves wherein the compressed crimp ring 16 may be slidably inserted. The crimp ring 16 is shaped as a hexagon such that two outer edges of the hexagon may be supported by the central portion of the fingers 112A–112B.

FIG. 5 represents the first step taken in the construction of a modular telecommunication cord 40, while using the cordage fixture and insertion tool 100. The sled 4 is first inserted into the cord jacket, after which the crimp ring 16 is compressed onto the outer jacket 7 of the cord 40. The cover 18 is then attached to the sled 4 as described with reference to FIG. 1. The modular telecommunication cord 40, without the housing 20 and blades 36 attached, is then pushed into the longitudinal concave portion 104 of the tool 100 with the crimp ring 16 situated outside of the fingers 112A–112B. The cord 40 may then be pushed into the proximate portion 106 of the elongated body 102, thereby fitting the crimp ring 16 into the elongated member 108 and providing a firm holding for the crimp ring 16, as illustrated by FIG. 6. Alternatively, the cord 40 may be pulled at a distal end 114 of the elongated body 102.

With the modular telecommunication cord 40 secured in the tool 100, the previously arranged wires 5, after being divided by the divider 10, and arranged in the sled 4, may then be clipped along the distal portion 8 of the sled 4, such that the ends of the wires 5 are even. After the wires 5 are properly arranged and clipped, as shown by FIG. 7, the cordage fixture and insertion tool 100 may then be used to push the modular telecommunication cord 40, with the sled 4, cover 18, and crimp ring 16 attached, into the housing 20, as shown by FIG. 8. The tool 100 thereby forces the modular telecommunication cord 40, and the wires therein, to remain straight during insertion of the sled 4 into the housing 20, thereby producing a modular telecommunication cord 40 having a stable echo.

While described as a tool 100 being a single solid unit, the cordage fixture and insertion tool 100 may be constructed of more than a single part. As an example, in an alternative embodiment, the elongated member 108, which, in accordance with FIG. 4, extends from the proximate portion 106 of the elongated body 102, may be a separate portion, hereafter referred to as a tip, which is attached to the proximate portion 106 of the elongated body 102, either in a permanent or temporary manner. As such, the tip contains the fingers 112A–112B at a proximate end of the tip and a flat portion at a distal end of the tip, which may be attached to the proximate portion 106 of the elongated body.

The tip, having fingers 112A–112B thereupon, may be attached to the proximate portion 106 of the elongated body 102 by using such means as an adhesive, a fixing means such as a screw, or an alternative attachment means. It should be noted, that although the tip may be separated from the elongated body 102, when the tip is attached, the longitudinal concave portion 104 of the body 102 aligns with the central portion of the fingers 112A–112B, thereby still providing a means for the modular telecommunication cord 40 to be pushed into the longitudinal concave portion 104 of the body 102, with the crimp ring 16 still outside of the tool 100.

In accordance with the preferred embodiment of the invention, the tool 100 is made entirely of plastic. Alternatively, in accordance with an alternative embodiment of the invention, the elongated body 102 may be made of plastic with the tip made of aluminum or steel.

The foregoing has been illustrative of the features and the principles of the present invention. Various changes or modifications to the invention may be apparent to those skilled in the art without departure from the spirit and scope of the invention. All such changes or modifications are intended to be included herein and within the scope of the invention.

What is claimed is:

1. A cordage fixture and insertion tool for assisting in the manufacturing of a telecommunication cord having a crimp ring on an end thereof, the cordage fixture and insertion tool comprising:

an elongated body having a proximate and distal portion, and a top and bottom portion;

a longitudinal concave portion, located central to said top portion of said elongated body and having a central axis which extends from said proximate portion to said distal portion of said elongated body, wherein said longitudinal concave portion is capable of receiving said cord; and an elongated member which extends in a manner axially adjacent to said longitudinal concave portion, from said proximate portion of said tool and is configured to secure said crimp ring to said tool.

2. The tool of claim 1, wherein said elongated member is removably attached to said elongated body.

3. The tool of claim 1, wherein said elongated member is further defined by a series of fingers having an inner surface and an outer surface, wherein said inner surfaces are shaped in a manner appropriate to engage an outer surface of said crimp ring.

4. The tool of claim 1, wherein said tool is made of a metallic material.

5. The tool of claim 1, wherein said tool is made of a plastic material.

6. The tool of claim 2, wherein said elongated body is made of a metallic material, and said elongated member is made of a plastic material.

7. The tool of claim 2, wherein said elongated body is made of a plastic material, and said elongated member is made of a metallic material.

8. A cordage fixture and insertion tool for assisting in the manufacturing of a telecommunication cord, comprising:

a means for securing a portion of said cord, having a plug assembly attached to an end of said cord, into a longitudinal concave portion of an insertion tool, such that said plug assembly is located outside of a first side of said tool, while said cord is secured by said tool; and a means for securing a crimp ring located on said cord, to said first side of said tool, such that when said plug assembly is situated into a housing, a series of wires, located in said cord, remain stationary.

9. The tool of claim 8, wherein said crimp ring is made of a metallic material.

10. The tool of claim 8, wherein said means of securing said crimp ring is a series of fingers.

11. The tool of claim 10, wherein said series of fingers comprises a first finger and a second finger having an inner surface and an outer surface, wherein said first finger and said second finger extend parallel to each other, such that said inner surfaces are directly opposite each other.

12. The tool of claim 10, wherein said fingers are removably attached to said tool.

13. The tool of claim 11, wherein said crimp ring is shaped as a hexagon, and said inner surfaces of said first finger and said second finger are shaped to engage said crimp ring.

* * * * *